United States Patent Office 3,579,444
Patented May 18, 1971

3,579,444
METHODS OF SCALE INHIBITION
Al F. Kerst, Littleton, Colo., assignor to
Monsanto Company, St. Louis, Mo.
No Drawing. Filed Apr. 13, 1970, Ser. No. 27,983
Int. Cl. C02b 5/06
U.S. Cl. 210—58                    11 Claims

ABSTRACT OF THE DISCLOSURE

The precipitation of scale-forming salts in an aqueous system is inhibited by adding either stoichiometric or substoichiometric amounts to said system of an organo-phosphorous compound which is a substituted epoxy ethane polyphosphonic acid or its salt, said organo-phosphorus compound having the formula

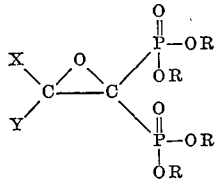

wherein R is hydrogen or a metal ion, and X and Y are hereinafter defined.

METHODS OF SCALE INHIBITION

This invention relates to methods for inhibiting the precipitation of metal ions from aqueous solutions, and more particularly, to the use of substituted epoxy ethane polyphosphonic acids and their salts or mixtures to accomplish this purpose.

Most commercial water contains alkaline earth metal cations, such as calcium, barium, magnesium, etc., and several anions such as bicarbonate, carbonate, sulfate, oxalate, phosphate, silicate, fluoride, etc. When combinations of these anions and cations are present in concentrations which exceed the solubility of their reaction products, precipitates form until their reaction solubility product concentrations are no longer exceeded. For example, when the concentrations of calcium ion and sulfate ion exceed the solubility of the calcium sulfate, a solid phase of calcium sulfate will form.

Solubility product concentrations are exceeded for various reasons, such as evaporation of the water phase, change in pH, pressure or temperature, and the introduction of additional ions which form insoluble compounds with the ions already present in the solution.

As these reaction products precipitate on the surfaces of the water carrying system, they form scale. The scale prevents effective heat transfer, interferes with fluid flow, facilitates corrosive processes, and harbors bacteria. The presence of this scale is an expensive problem in many industrial water systems, oilwells, and the like, causing delays and shutdowns for cleaning and removal.

Scale-forming compounds can be prevented from precipitating by inactivating their cations with chelating or sequestering agents, so that the solubility of their reaction products is not exceeded. Generally, this requires many times as much chelating or sequestering agent as cation, and these amounts under certain conditions are not always desirable or economical.

More than twenty-five years ago it was discovered that certain inorganic polyphosphates would prevent such precipitation when added in amounts less than the concentrations needed for sequestering or chelating. See, for example, Hatch and Rice, "Industrial Engineering Chemistry," vol. 31, pages 51 and 53; Reitemeier and Buehrer, "Journal of Physical Chemistry," vol. 44, No. 5, pages 535 and 536 (May 1940); Fink and Richardson U.S. Pat. 2,358,222; and Hatch U.S. Pat. 2,539,305, all of which are incorporated herein by reference. For sequestration, the mole ratio of precipitation inhibitor equivalents to scale forming cation is usually 1:1 or greater (2:1, 3:1, etc.). These ratios are referred to as stoichiometric. Substoichiometric amounts would include all mole ratios of precipitation inhibitor equivalent to scale forming cation that are less than the level required for sequestration; this phenomenon is known in the water treating art as the "threshold" effect. It is to be understood that the term "threshold" as utilized herein refers to the chemical and/or physical phenomenon that less than stoichiometric quantities of the particular precipitation inhibitor can effectively prevent the precipitation of various metallic ions such as calcium, iron, copper and cobalt. In other words, the "threshold" treatment of water is that technique by means of which less than stoichiometric quantities of the treating agent are added to interfere with the growth of crystal nuclei and thereby prevent the deposition of insoluble deposits.

Consequently, precipitation inhibitors which function as a threshold agent and a sequestering agent represent an advancement in the art and are in substantial demand.

Therefore, an object of this invention is to provide a method for inhibiting the precipitation of metal ions from aqueous solutions.

Another object of this invention is to provide a precipitation inhibitor which is effective in inhibiting the precipitation of metal ions in acid or alkaline aqueous solutions.

A still further object of this invention is to provide a precipitation inhibitor which is effective in inhibiting the precipitation of calcum ions in acid or alkaline solutions.

Other objects will become apparent from a reading of the following detailed description.

It has been found that certain organo-phosphorus compounds, i.e., substituted epoxy ethane polyphosphonates, corresponding to the following formula (I)

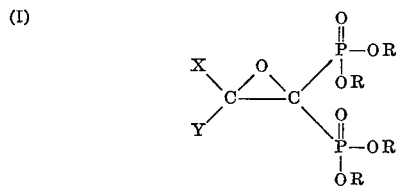

unexpectedly function as superior precipitation inhibitors when used in substoichiometric concentrations. The phenomenon includes what is generally known in the art as the "threshold" effect. Furthermore those organo-phosphorus compounds function as sequestering agents where one so desires to use the same.

In the above Formula I, X and Y are each alike or unlike and are from the group hydrogen, alkyl containing from 1 to 30 (preferably 1 to 8 and more preferably 1 to 4) carbon atoms (including branch and straight chain members), phenyl, halogen (preferably chlorine, bromine, fluorine and iodine) substituted phenyl,

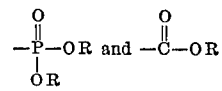

wherein R is hereinafter defined.

In Formula I, R is a metal ion or hydrogen, the aforementioned metal ions are from the group of metals alkali metals such as sodium, lithium and potassium, alkaline earth metals, such as calcium and magnesium, aluminum, ammonium, zinc, cadmium, manganese, nickel, cobalt, cerium, lead, tin, iron, chromium, mercury and amine. In particular, amines having a low molecular weight, such as below about 300, and more particularly the alkyl amines, alkylene amines, and alkanol amines containing not more than two amine groups, such as ethyl amine, diethyl amine, propyl amine, propylene diamine, hexyl amine, 2-ethylhexylamine, N-butylethanol amine, triethanol amine, and the like, are the preferred amines. It is to be understood that the preferred metal ions are those which render the compound a water-soluble salt, e.g., sodium. It is to be understood that all of the compounds falling within the above Formula I and as heretofore defined are generically described herein as "epoxy ethane polyphosphonates" or "EEPP." In other words then, the acids, salts and mixtures thereof are all generically described herein as epoxy ethane polyphosphonates or EEPP.

In conjunction with the generic Formula I, this includes, without limitation, the following sub-generic formula:

(II) 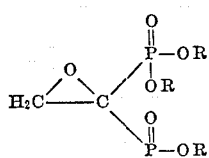

(III) 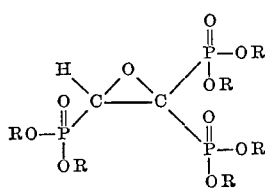

(IV) 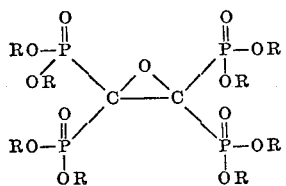

(V) 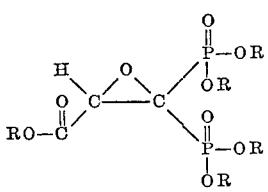

(VI) 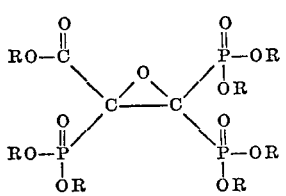

(VII) 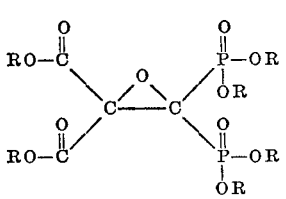

(VIII) 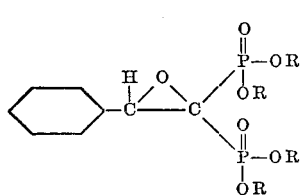

(IX) 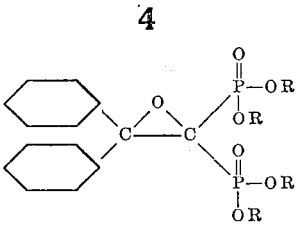

(X) 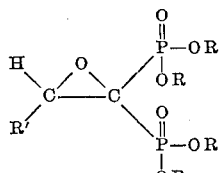

(XI) 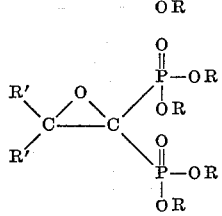

In the above Formulae X and XI, R' is an alkyl group containing from 1 to 30, preferably 1 to 8 and more preferably 1 to 4, carbon atoms. It is to be understood that R' includes straight and branched chain lengths and isomers.

As illustrative of the epoxy ethane polyphosphonates which fall within the above Formula I, there may be mentioned, without limitation, the following compounds:

(1) $H_2\overset{\frown{O}}{C-C}(PO_3H_2)_2$ (2) $(C_6H_5)(HO_2C)\overset{\frown{O}}{C-C}(PO_3H_2)_2$ (3) $CH_3(H)\overset{\frown{O}}{C-C}(PO_3Na_2)_2$ (4) $H_2O_3P(H)\overset{\frown{O}}{C-C}(PO_3H_2)_2$ (5) $(Na_2O_3P)(C_6H_5)\overset{\frown{O}}{C-C}[PO_3(Na)_2]_2$ (6) $(NaHO_3P)(NaO_2C)\overset{\frown{O}}{C-C}(PO_3NaH)_2$ (7) $ClH_4C_6(H)\overset{\frown{O}}{C-C}(PO_3H_2)_2$ (8) $H_5C_6(H_2O_3P)\overset{\frown{O}}{C-C}(PO_3H_2)_2$ (9) $H_9C_4(H_2O_3P)\overset{\frown{O}}{C-C}(PO_3H_2)_2$

(10) $(K_2O_3P)_2\overset{\frown{O}}{C-C}(PO_3K_2)_2$

(11) $HO_2C(H)\overset{\frown{O}}{C-C}(PO_3H_2)_2$

(12) $NaO_2C(C_2H_5)\overset{\frown{O}}{C-C}(PO_3Na_2)_2$

(13) $(HO_2C)_2\overset{\frown{O}}{C-C}(PO_3H_2)_2$

(14) $(NaO_2C)(ClH_4C_6)\overset{\frown{O}}{C-C}(PO_3Na_2)_2$

(15) $(H_5C_6)_2\overset{\frown{O}}{C-C}(PO_3Na_2)_2$

In general, the epoxy ethane polyphosphonates can be prepared according to the following equations:

(1) $X-C(Q)_2-Y + (R)_2O_3PCH(M)PO_3(R)_2 \xrightarrow[\text{(solvent)}]{\text{tetrahydrofuran}}$ $XYCHCQ[PO_3(R)_2]_2 + MQ$ (2) $XYCHCQ[PO_3(R)_2]_2 + (R')_3N \longrightarrow$ $XYCC[PO_3(R)_2]_2 + (R')_3N \cdot HQ$ (3) $XYCC[PO_3(R)_2]_2 \xrightarrow{\text{Peroxy compound}} XY\overset{\frown{O}}{C-C}[PO_3(R)_2]_2$ In the foregoing equations, X and Y and R are the same as herein defined; (R')₃N represents a tertiary amine such as triethyl amine, R' having the same connotation as heretofore ascribed; M represents a metal ion such as sodium; and Q represents a halogen such as chlorine; and the peroxy compound may be from the group organic hydroperoxide, hydrogen peroxide, organic per acids or mixtures thereof.

In carrying out the aforementioned reactions as represented by Equations 1, 2 and 3, generally the reaction can be conducted at temperatures between about 0° C. and 100° C., and preferably from about 15° C. to about 75° C. It is also within the scope of these processes to utilize atmospheric, sub-atmospheric (e.g., ½ to 760 mm. Hg) or super-atmospheric (e.g., up to 10 atmospheres) pressure.

Although the precipitation inhibitors of the present invention are of general utility whenever it is desired to inhibit the precipitation of metal ions from aqueous solutions, they are especially effective in such applications as liquid soaps and shampoos, bar soaps, scouring wool cloth, cotton kier boiling, cotton dyeing, cotton bleaching, metal cleaning compounds, rubber and plastics trace metal contamination (compounding and polymerization), and pulp and paper trace metal contamination.

The amount of the precipitation inhibitor necessary to be effective varies with, inter alia, the type and amount of problem metal ions, pH conditions, temperature and the like. When using substoichiometric amounts the preferred mole ratio of the precipitation inhibitor to the scale forming cation salt is from about 1:1.5 to about 1:10,000. When using sequestering amounts, i.e., at least stoichiometric quantities, the preferred mole ratio is from about 1:1 to 2.5:1.

It is within the scope of the present invention that the precipitation inhibitors of the present invention may also be used in aqueous systems which contain inorganic or organic materials, with the proviso that such materials do not render the precipitation inhibitors substantially ineffective for their end purpose. For examplary purposes only, water-soluble inorganic chromates such as those described in U.S. 3,431,217 (which is incorporated herein by reference) may be used in combination with said inhibitors. Other materials which can be used with said precipitation inhibitors include, for example, surface active agents and corrosion inhibitors such as those described in Corrosion Inhibitors, by Beegman, published by MacMillan in 1963 and which is incorporated herein by reference. Furthermore, other precipitation inhibitors such as amino tri(methylene phosphonic acid) may be used in combination with the precipitation inhibitors of the present invention. For examplary purposes only, these other precipitation inhibitors are described in U.S. 2,970,959, U.S. 3,234,124, U.S. 3,336,221, U.S. 3,400,078, U.S. 3,400,148, U.S. 3,451,939 and U.S. 3,462,365, all of which publications are incorporated herein by reference.

The following examples are included to illustrate the practice of the present invention and the advantages provided thereby but are not to be considered limiting. Unless otherwise specified, all parts are parts by weight and all temperatures are in degrees centigrade.

TABLE I

Epoxy ethane polyphosphonic acids and their salts as precipitation inhibitors

| Additive compound No. | Time to failure | | | |
|---|---|---|---|---|
| | CaCO₃ (6,500 p.p.m.) 25° C., pH=7.2 p.p.m. additive | CaCO₃ (400 p.p.m.) 25° C., pH=7.2 p.p.m. additive | CaSO₄ (6,500 p.p.m.) 25° C., pH=7.2 p.p.m. additive | CaSO₄ (8,500 p.p.m.) 95° C., pH=7.5 2.7 p.p.m. additive [1] |
| Blank | 1 min | 3 min | 1 hr | 3 minutes. |
| 1 | 6 days | 3 days | 7 days | 60 minutes. |
| 2 | do | 4 days | 18 days | Do. |
| 3 | 7 days | 3 days | 5 days | Do. |
| 4 | 6 days | do | 3 days | 90 minutes. |
| 5 | do | 2 days | 7 days | 20 minutes. |
| 6 | 5 days | do | 6 days | 50 minutes. |
| 7 | 4 days | 2 days | 5 days | 40 minutes. |
| 8 | 3 days | 1 day | do | 60 minutes. |
| 9 | 6 days | 4 days | 8 days | 80 minutes. |
| 10 | 5 days | 3 days | 1 day | 20 minutse. |
| 11 | do | do | 4 days | 50 minutes. |
| 12 | 2 days | 4 days | do | 45 minutes. |
| 13 | 8 days | 5 days | 9 days | 85 minutes. |
| 14 | 5 days | 3 days | 4 days | 40 minutes. |
| 15 | 6 days | 4 days | 7 days | 70 minutes. |

[1] 0.5M NaCl.

EXAMPLE I

In order to demonstrate the unique properties of the epoxy ethane polyphosphonic acids and their salts (EEPP), the following procedure is carried out. Measured volumes of concentrated NaHCO₃ and Na₂SO₄ are individually and separately added to solutions containing calcium chloride and the desired EEPP, which is indicated by the compound number (heretofore described) in the first column of Table I. The temperature of the resultant solutions and the pH are also shown in Table I. The time necessary for visual observation of significant amounts of precipitate is called the "Time to Failure." The results of these tests are set forth in Table I.

In conjunction with the results set forth in Table I, the "blank" additive did not contain any EEPP and consequently was utilized as a control. The EEPP ("additive") precipitation inhibitors are used in substoichiometric amounts. The utilization of the particular EEPP "additives" is vividly demonstrated in that the use of these additives as shown results in a seven-fold to a 10,000-fold value effectiveness as a precipitation inhibitors as compared to no inbibitor. The utility of these precipitation inhibitors thus is uniquely demonstrated.

EXAMPLE II

The above Example I is repeated several times with the concentration of the specific EEPP additive being respectively 25 p.p.m., 100 p.p.m., 200 p.p.m. and 500 p.p.m. The results utilizing these different concentrations than that set forth in Example I are similar to the results obtained in Example I.

EXAMPLE III

This example illustrates the sequestering ability of the acid and salt forms of the epoxy ethane polyphosphonates.

The testing procedure consists of pipetting an aliquot volume of 2.5% ferric chloride solution into a beaker and adding thereto enough sodium hydroxide or hydrochloric acid to give the desired pH. The solution is stirred for fifteen minutes, followed by the addition of an aliquot of 2.5% of the sequestering agent solution, e.g., the particular epoxy ethane polyphosphonate (in the salt form) dissolved in water. After final pH adjustment with sodium hydroxide or hydrochloric acid, the solution is shaken for 48 hours to reach equilibrium. The solution is then centrifuged at 12,000 r.p.m. for approximately 80 minutes to remove colloidal ferric hydroxide and an aliquot of the supernatant solution is titrated iodometrically or analyzed by X-ray fluorescence with use of an appropriate calibration curve in order to determine the ferric iron concentration. The ferric iron concentrations and sequestering agent concentrations found in parts per million (p.p.m.) are converted to a weight basis and expressed as pounds of iron sequestered by 100 pounds of sequestering agent.

Following the above-described procedure, each of the compounds Nos. 1 through 15 heretofore described is individually tested. In each case it is found that the sequestering agents of the instant invention demonstrate a unique ability to sequester ferric iron over a wide range of pH conditions, i.e., from about 4 to about 10.5, and that the average amount (in pounds) of iron sequestered by 100 pounds of the respective sequestering agent (compound No.) over the 4 to 10.5 pH range is 5, 5, 4, 11, 10, 8, 5, 6, 7, 8, 9, 6, 10, 10 and 8.

EXAMPLE IV

The above Example III is repeated four individual and separate times with the exception that other metal ion-containing solutions such as calcium, copper, nickel and chromium are utilized in place of the ferric (chloride) solution. In each case utilizing the aforementioned compounds the average sequestration values of these latter mentioned ions respectively are found to be similar to those set forth above.

The foregoing examples have been described in the foregoing specification for the purpose of illustration and not limitation. Many other modifications and ramifications will naturally suggest themselves to those skilled in the art based on this disclosure. These are intended to be comprehended as within the scope of this invention.

What is claimed is:

1. A method of inhibiting the precipitation of scale-forming salts in an aqueous system comprising adding at least a precipitating inhibition amount of an epoxy ethane polyphosphonate having the general formula

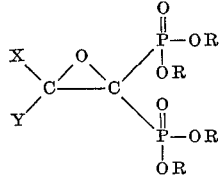

wherein X and Y are each like or unlike and are each selected from the group consisting of

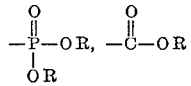

phenyl, halogen substituted phenyl, hydrogen and alkyl which contains from 1 to 30 carbon atoms; and R is selected from the group consisting of hydrogen and metal and amine ions, to said system.

2. The method of claim 1 wherein the scale-forming salt is alkaline earth metal carbonates, sulfates, oxalates, phosphates, fluorides or silicates.

3. The method of claim 1 wherein the mole ratio of precipitation inhibitor to scale-forming salts is from about 1 to 1.5 to about 1 to 10,000.

4. The method of claim 3 wherein the precipitation inhibitor is present in the system at concentrations from about 0.1 part per million to about 500 parts per million.

5. The method as set forth in claim 1 wherein X and Y both are hydrogen.

6. The method as set forth in claim 1 wherein R is hydrogen.

7. The method as set forth in claim 1 wherein R is a metal ion selected from the group consisting of alkali metals, alkaline earth metals, ammonia, zinc, cadmium, magnesium, aluminum and mixtures thereof.

8. The method as set forth in claim 1 wherein the epoxy ethane polyphosphonate is

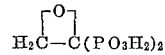

9. The method as set forth in claim 1 wherein the epoxy ethane polyphosphonate is

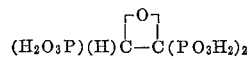

10. The method as set forth in claim 1 wherein the epoxy ethane polyphosphonate is

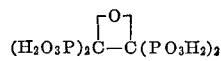

11. The method as set forth in claim 1 wherein the aqeuous system contains a water-soluble chromate.

References Cited

UNITED STATES PATENTS

| | | | |
|---|---|---|---|
| 3,299,123 | 1/1967 | Fitch et al. | 260—501.21X |
| 3,422,137 | 1/1969 | Quimby | 260—501.21X |
| 3,451,939 | 6/1969 | Ralston | 252—181 |
| 3,487,018 | 12/1969 | Troscinski | 210—58 |
| 3,496,223 | 2/1970 | Irani et al. | 260—502.4 |
| 3,528,998 | 9/1970 | Tersoro | 260—348 |

MICHAEL ROGERS, Primary Examiner

U.S. Cl. X.R.

21—2.7; 252—180; 260—348